(No Model.)

J. B. ROBERTSON.
WHEEL FOR VELOCIPEDES.

No. 477,962.  Patented June 28, 1892.

Witnesses:
J. A. Rutherford
Robert Everett

Inventor:
Joseph B. Robertson
By James L. Norris.
Attorney.

UNITED STATES PATENT OFFICE.

JOSEPH B. ROBERTSON, OF BELFAST, IRELAND.

WHEEL FOR VELOCIPEDES.

SPECIFICATION forming part of Letters Patent No. 477,962, dated June 28, 1892.

Application filed March 29, 1892. Serial No. 426,915. (No model.)

*To all whom it may concern:*

Be it known that I, JOSEPH BUCHANAN ROBERTSON, a subject of the Queen of Great Britain, residing at 184 Grosvenor Street, Belfast, Ireland, have invented new and useful Improvements in Wheels for Velocipedes and other Vehicles, of which the following is a specification.

My invention relates to means of securing on the rim of a wheel for a velocipede or other vehicle a cover for the inflated tube employed in what are usually called "pneumatic tires," as I shall describe, referring to the accompanying drawings.

Figure 1:
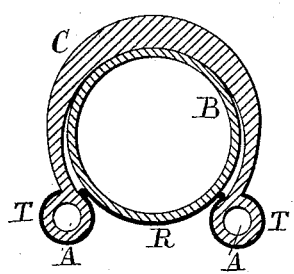
Figure 2:
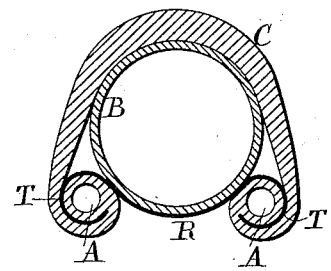
Figure 3:
Figure 4:
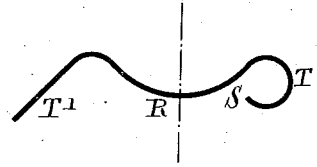
Figure 5:
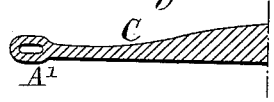
Figure 6:
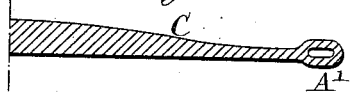

Figure 1 is a transverse section of rim and tire according to my invention. Fig. 2 is a transverse section of a modified construction. Fig. 3 is a section of the rim suited for the tire shown in Fig. 1, the left half of Fig. 3 showing the form of rim as it might first be rolled, the right half showing its finished form. Fig. 4 is a similar section of rim suited for the tire shown in Fig. 2. Fig. 5 is a half-transverse section of the cover suited for the tire shown in Fig. 1, and Fig. 6 is a half-transverse section of the cover suited for the tire shown in Fig. 2.

Like letters of reference are employed to indicate corresponding parts in the several figures.

The rim R, which may be rolled of sheet-steel or other suitable metal of the form half shown on the left sides of Figs. 3 and 4, has its sloped sides T' afterward turned inward by rolling or otherwise to form tubes T with a comparatively narrow opening or slit S, extending the whole length of the rim. The cover C, of caoutchouc or of caoutchouc and canvas combined or of other suitable material, is made with a narrow air-channel A' near each edge, extending its whole length. In putting on the cover C over the tube B, commonly known as the "bladder," before inflating tube B, the edges of the cover C are squeezed through the slits S into the tubes T, and then the channels A' are inflated, thereby swelling them out, as shown at A, to fill the tubes T, after which the bladder B is inflated. The swelling out of the tubular parts A of the cover by making these parts wider than the slits S prevents them from being drawn out of the tubes T; but if it should be necessary to remove the cover C the pressure in the tubular parts A can be relieved, and then they can be drawn out through the slits S. In this manner the tire is effectually secured to the rim of the wheel without the use of cement, binding-wires, or other attachments, and in a manner admitting of the tire being easily removed or replaced.

Although I have shown two special forms of wheel-rim, each made in one piece, which I prefer, obviously other forms of rim might be employed not necessarily in one piece; also, the forms of the tire and rim might be varied without departing from the method which I have described of securing them together.

Having thus described the nature of my invention and the best means I know for carrying the same into practical effect, I claim—

1. The herein-described method of securing a pneumatic tire to the rim of a wheel by inflating air-channels formed near the edges of the tire-cover within tubular channels formed at the edges of the rim with narrow slits, through which the channeled edges of the cover are inserted before they are inflated.

2. For securing a pneumatic tire to the rim of a wheel in the manner above referred to, in combination with the bladder, a cover having air-channels near its edges, and a rim having tubular channels with narrow slits to admit the edges of the cover, substantially as herein described.

In testimony whereof I have signed my name to this specification, in the presence of two subscribing witnesses, this 17th day of March, A. D. 1892.

JOSEPH B. ROBERTSON.

Witnesses:
CLAUDE A. RUBY,
M. J. KEARY.